United States Patent
Torola et al.

(10) Patent No.: US 11,971,979 B2
(45) Date of Patent: Apr. 30, 2024

(54) INTEGRITY VIOLATION DETECTION FOR SYSTEM SERVICES

(71) Applicant: BMC Software, Inc., Houston, TX (US)

(72) Inventors: Jason Ronald Torola, Katy, TX (US); Anthony Louis Lubrano, Sugar Land, TX (US); Subhasish Sarkar, Pune (IN)

(73) Assignee: BMC Software, Inc., Houston, TX (US)

(*) Notice: Subject to any disclaimer, the term of this patent is extended or adjusted under 35 U.S.C. 154(b) by 394 days.

(21) Appl. No.: 17/538,655

(22) Filed: Nov. 30, 2021

(65) Prior Publication Data

US 2023/0169162 A1    Jun. 1, 2023

(51) Int. Cl.
  *G06F 21/52*  (2013.01)
  *G06F 9/54*   (2006.01)

(52) U.S. Cl.
  CPC .......... *G06F 21/52* (2013.01); *G06F 9/54* (2013.01); *G06F 2221/034* (2013.01)

(58) Field of Classification Search
  CPC ....... G06F 21/52; G06F 9/54; G06F 2221/034
  See application file for complete search history.

(56) References Cited

U.S. PATENT DOCUMENTS

| | | | | |
|---|---|---|---|---|
| 8,589,863 | B2* | 11/2013 | Dan | G06F 8/10 717/126 |
| 9,342,783 | B1* | 5/2016 | Chang | G06F 16/24578 |
| 10,742,674 | B1* | 8/2020 | McLinden | H04L 63/105 |
| 2010/0153906 | A1* | 6/2010 | Dan | G06F 8/10 717/104 |
| 2013/0298243 | A1* | 11/2013 | Kumar | H04L 63/1408 726/25 |
| 2014/0196134 | A1* | 7/2014 | Yamaguchi | G06F 21/44 726/7 |
| 2019/0258829 | A1* | 8/2019 | Pitel | G06F 21/30 |
| 2019/0342305 | A1* | 11/2019 | Sunkaranam | H04L 63/145 |

(Continued)

OTHER PUBLICATIONS

"SVC routing—IBM Documention", available online at <https://www.ibm.com/docs/en/zos/2.3.0?topic=summary-svc-routines>, 2015, 1 page.

(Continued)

*Primary Examiner* — Matthew Smithers
(74) *Attorney, Agent, or Firm* — Brake Hughes Bellermann LLP

(57) ABSTRACT

Described systems and techniques store, at a first time, first system service verification data that includes a first capture of a system services table having at least one system service entry, and a first portion of a system service identified in the at least one system service entry. At a second time, second system service verification data may be stored that includes a second capture of the system services table and a second portion of the system service identified in the at least one system service entry. At least one mismatch between the first system service verification data and the second system service verification data may be determined. At least one security notification message identifying the at least one mismatch with respect to at least one of the second capture of the system services table and the second portion may thus be generated.

20 Claims, 4 Drawing Sheets

(56) References Cited

U.S. PATENT DOCUMENTS

2022/0124095 A1* 4/2022 Cheng .................. H04L 63/101

OTHER PUBLICATIONS

"SVC Summary—IBM Documentation", available online at <https://www.ibm.com/docs/en/zos/2.3.0?topic=reference-svc-summary>, 2015, 1 page.

"SVC Table—IBM Documentation", available online at <https://www.ibm.com/docs/en/zos/2.3.0?topic=summary-svc-table> 2015, 2 pages.

* cited by examiner

INTEGRITY VIOLATION DETECTION FOR SYSTEM SERVICES

TECHNICAL FIELD

This description relates to computer and network security.

BACKGROUND

Maintaining security is an important and difficult objective when using and administering computers, computer networks, and various other computing resources. For example, it is important to maintain confidentiality, integrity, availability, and/or control of computing resources.

In some scenarios, one person or group may be tasked with maintaining security of computing resources being accessed by many other users. For example, an administrator may be tasked with protecting a mainframe computing system being accessed by many different enterprise users.

In these and other scenarios, the users may have varying levels of access to the computing resources. Moreover, the various users may each be executing multiple applications that require access to central computing resources. Consequently, access events may occur frequently and rapidly, and many unauthorized access events may be difficult to identify, or may be difficult to distinguish from similar, authorized access events.

SUMMARY

According to one general aspect, a computer program product is tangibly embodied on a non-transitory computer-readable storage medium. The computer program product comprises instructions that, when executed by at least one computing device, are configured to cause the at least one computing device to store, at a first time, first system service verification data that includes a first capture of a system services table having at least one system service entry, and a first portion of a system service identified in the at least one system service entry. The instructions, when executed by at least one computing device, are configured to cause the at least one computing device to store, at a second time, second system service verification data that includes a second capture of the system services table and a second portion of the system service identified in the at least one system service entry. The instructions, when executed by at least one computing device, are configured to cause the at least one computing device to determine at least one mismatch between the first system service verification data and the second system service verification data, and generate at least one security notification message identifying the at least one mismatch with respect to at least one of the second capture of the system services table and the second portion.

According to other general aspects, a computer-implemented method may perform the instructions of the computer program product. According to other general aspects, a system, such as a mainframe system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below.

Other features will be apparent from the description and drawings, and from the claims.

DETAILED DESCRIPTION

Figure 1:
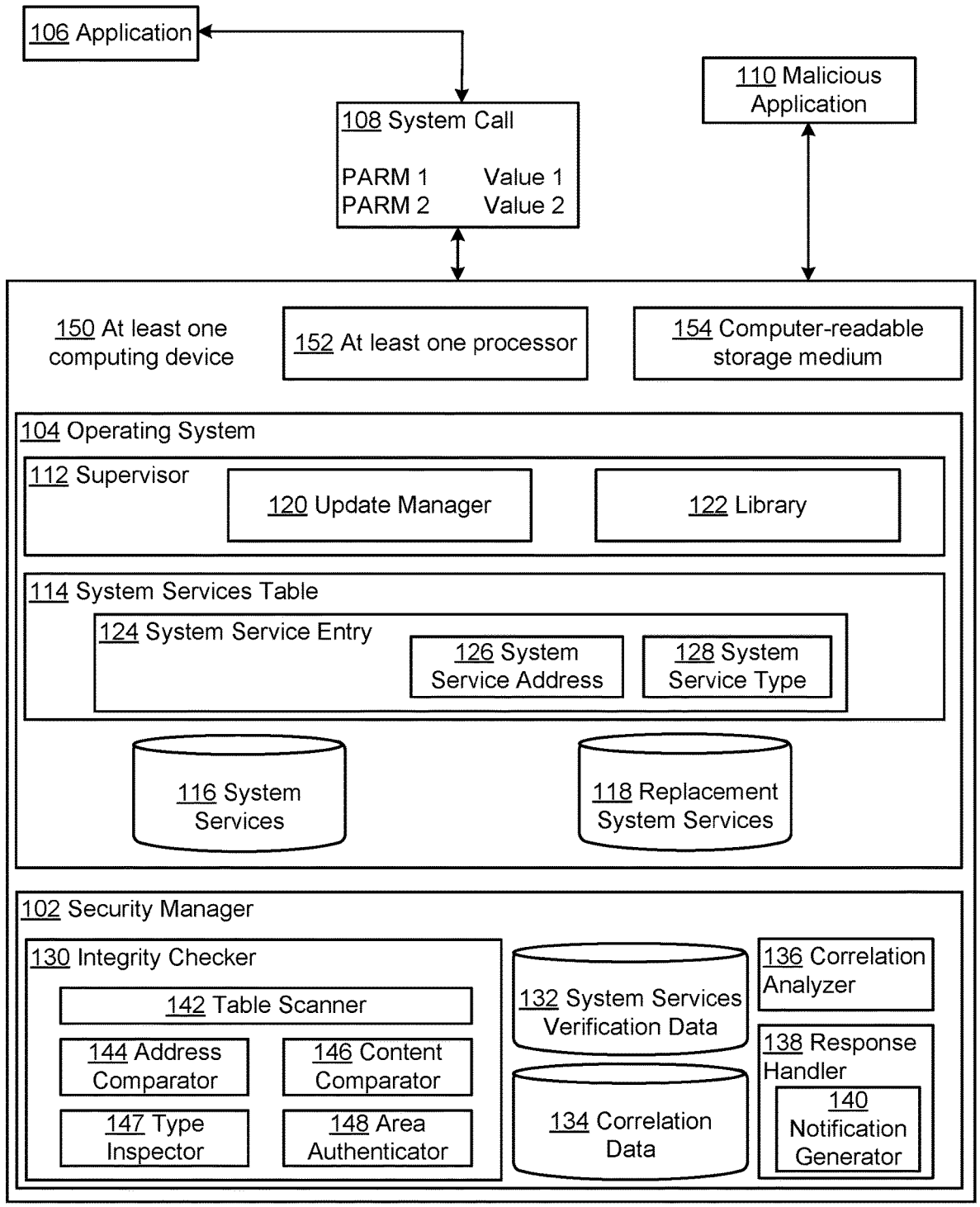
FIG. 1 is a block diagram of a system for integrity violation detection for system services.

Described systems and techniques enable rapid detection of potential security threats, even when the potential security threats are difficult to distinguish from normal operations of a system being monitored. Accordingly, it is possible to provide fast, accurate, actionable notifications to system administrators. Further, described systems and techniques may correlate detected potential security threats with other suspicious activities, so as to identify and respond to actual security threats.

Many security threats may be directed towards gaining some level of control over an operating system (OS) of a computer. An operating system, by definition, provides access to, and control over, various system resources. For example, an operating system typically provides control of hardware resources, as well as multiple applications that may be utilizing the operating system. Operating system access may therefore be limited to users having a high degree of clearance and authorization (e.g., administrators). If an attacker gains access to, or control over, operating system functions, then the attacker may be very difficult to detect or disrupt.

At the same time, an operating system may provide many important functions to many different applications. In particular, an operating system typically provides functions that are used across many or all applications, such as functions related to allocating memory to one application or another. As such functions are common to the various applications within the system and provided at a meta level to the applications by the operating system, such functions may be referred to as system services.

For purposes of maintaining security, it would be desirable to provide such system services in an entirely standardized and protected fashion. That is, given the level of threat associated with control of such system services, as referenced above, a system designer might simply implement a discrete set of system services with strict limits on a manner and extent to which users might use, modify, replace, or add to the system services.

In practice, however, such an approach is typically balanced against a need for providing users with flexible options for designing and using applications that require the system services. For example, a system designer might provide users with documented techniques for using, modifying, replacing, or adding specific system services, so as to enable implementation of desired use of the system services with respect to specific applications.

Unfortunately, an attacker may attempt to utilize such documented techniques, or variations thereof, to access or implement system services in a manner that enables control of the operating system, and potentially of the computer(s) as a whole. As referenced above, the high degree of authority imparted by such control results in a severe security threat, which may be difficult to stop once initiated.

Thus, it may be appreciated from the above that a system administrator, or other personnel tasked with system security, may be faced with a situation in which many different users and applications are accessing both standard and customized system services for legitimate purposes, while attackers may also be attempting to leverage system services for unauthorized purposes. In such scenarios, it is important to not only discover and identify potential unauthorized access events, but to do so as quickly as possible.

Described techniques monitor invocations of system services, using a system services table, and analyze entries in the system services table and related storage locations to determine potential illicit uses of the system services. Described techniques generate notifications regarding the potential illicit uses, provide analysis to determine whether the potential illicit uses are actual illicit uses, and take preventative actions to ensure that potential or actual illicit uses do not compromise system security.

Described techniques may be performed regularly, dynamically, or on demand, so as to determine and respond to potential threats quickly. Moreover, described techniques may be performed with respect to many different users, and across many different applications, to ensure that potential threats are detected.

FIG. 1 is a block diagram of a system for integrity violation detection for system services. In the example of FIG. 1, a security manager 102 provides security with respect to operations of an operating system 104. As referenced above, and illustrated in FIG. 1, an application 106 may issue a system call 108 to the operating system 104. The security manager 102 may be configured to detect potential threats associated with the system call 108, or with responses to the system call 108 by the operating system 104.

For example, a malicious application 110 may previously have altered functions of the operating system 104, so that the system call 108 achieves an objective of the malicious application 110 (such as providing control to a user of the malicious application 110, or executing a function desired by the user of the malicious application), even if a user of the application 106 is not aware of such an objective. In other examples, the application 106 itself may represent a malicious application that is executing the system call 108 for the same or similar types of illicit objectives referenced above.

In more detail, the operating system 104 includes a supervisor 112, which is configured to utilize a system services table 114 to provide system services 116 in response to the system call 108, and similar system calls. The supervisor 112 may be referred to, or may perform the same or similar functions as, a kernel of the operating system 104.

In example use case scenarios, the supervisor 112 may operate in a supervisor state, in which, as referenced above and described in more detail, below, a high degree of system control (also referred to as privilege) is imparted to the operating system 104, and, thereby indirectly, to the application 106 and/or the malicious application 110. For example, such control or privilege may include an ability to take action across multiple (e.g., all) address spaces, and an ability to directly manipulate hardware devices.

More generally, the system services 116 may relate to functions such as process control, file management, device management, system maintenance, system/device metadata maintenance, communications, and protections/permissions. To organize and implement such functions, the system services table 114 may delineate discrete services or service types, e.g., by enumerating individual ones of the system services 116 and corresponding system calls, represented by the system call 108.

For example, a first system service may implement a WAIT command, so that the system call 108 may invoke the WAIT function of the first system service by designating a system service having a value of "1." Other system services, such as POST, DELETE, EXIT, LINK, or LOAD may also be associated with corresponding numbers, or other suitable designation(s).

As such functions may be useful to many or all applications executing using the operating system 104, the system services 116 may represent or include standardized, native services of the operating system 104. For example, a provider of the operating system 104 may design and implement the system services 116, memorialize the system services 116 in the system services table 114, and otherwise make the system services 116 available to authorized users.

In addition, the operating system 104 may enable implementation and use of replacement or user-modified system services, illustrated in FIG. 1 as replacement system services 118. For example, the replacement system services 118 may directly supplant and replace a native system service, and/or may implement a user-defined function using system services and associated system calls that are designated for user modifications.

In other words, as referenced above, maintaining system security might imply strict control of a limited set of system services, but a need for user flexibility in application design has led to providing authorized users with an ability to modify, customize, or otherwise replace native system service functionality. For example, in FIG. 1, the supervisor 112 is illustrated as including an update manager 120, which may be configured to modify the system services table 114, the system services 116, and/or the replacement services 118.

The supervisor 112 is also illustrated as including a library 122, which may represent or include, e.g., code for passing information to the supervisor 112 from the system call 108, switching to supervisor mode, and otherwise acting as an interface or intermediary between the application 106, malicious application 110, and the supervisor 112. Thus, the library 122 may thus provide a layer of abstraction that facilitates use of the supervisor 112 by the application 106 and the malicious application 110.

For example, as generally illustrated in FIG. 1, the system call 108 may include one or more parameters (PARMs), for which corresponding values may be specified or requested. The types of parameters and values, and uses thereof, may vary depending on which system service is requested, but the library 122 may provide a macro or wrapper that abstracts such variations from being of concern to a user. Instead, communication of specific parameters and associated values may occur via the library 122, so that underlying functionalities of system services 116 and replacement system services 118 may occur without requiring designers of the application 106 and the malicious application 110 to have detailed knowledge of how to implement invoked ones of the system services 116 and replacement system services 118.

In many cases, the update manager 120 and the library 122 may be accessed and used by authorized users and for intended purposes. On the other hand, the update manager 120 and the library 122 may be used for malicious purposes. Modifications for malicious purposes may be extremely difficult to detect from among all of the authorized modifications performed for authorized purposes.

For example, the system services table 114 may include a plurality of entries corresponding to the various system services 116 and the replacement system services 118, so that, in FIG. 1, a system service entry 124 represents a single entry for a single, corresponding system service (or replacement system service). As shown, the system service entry 124 may specify a system service address 126, as well as a system service type 128.

More detailed and specific examples of the system service entry 124 are provided below, but for purposes of understanding the example of FIG. 1, the system service address 126 represents an identification of a memory or storage location at which a specific, corresponding system service is stored (e.g., within a memory represented by a non-transitory computer-readable storage medium 154, as discussed below). The storage location of the system service address 126 may occur within a larger storage region or area having known or determined address boundaries. Meanwhile, the system services type 128 represents one of a plurality of types of system services, and each of the various types may be associated with (e.g., may be expected to correspond to, or be included within) one of a plurality of storage areas (e.g., within the known address boundaries thereof).

When authorized users implement authorized techniques to access and implement the update manager 120 and the library 122, an integrity of the system services table 114 (including the system service entry 124), the system services 116, and the replacement system services 118 are all maintained. For example, in such scenarios, the system service of the system service entry 124 is of an expected system service type corresponding to the system service type 128. As another example, the system service address 126 continues to correspond to an expected storage location, which is also within the plurality of storage areas corresponding to the system service type 128 for the corresponding system service.

In unauthorized use case scenarios, however, the integrity of the system services table 114, the system services 116, and/or the replacement services 118 may be violated. For example, a system service expected to be at a particular storage address and/or within a particular storage area may exist at a different storage address, and/or within a different storage area. Moreover, content (e.g., code) of an authorized system service may be deleted, replaced, or supplemented. Similarly, a designated type of a system service may be altered.

To determine these and other potential security violations, an integrity checker 130 of the security manager 102 may be configured to capture system services verification data 132 over periods of time. In this way, the integrity checker 130 may be configured to analyze the captured system services verification data 132 to determine potential security risks.

In some implementations, because there may be many authorized modifications of the system services 116, including additions of authorized replacement services 118, the integrity checker 130 may not, by itself, be configured to indicate an actual security risk, but rather indicates a potential security risk. In such implementations, for example, correlation data 134 may be captured and stored, and a correlation analyzer 136 may be configured to determine an actual security risk, or assign a more definitive assessment (e.g., probability) of a security risk, of each designated potential security risk.

For example, the correlation data 134 may include various types of log data, or other collected data that is collected in parallel with the system services verification data 132. For example, the correlation data 134 may include user activities, including other types of behaviors or activities that may be considered to be high risk or indicative of potential security concerns. For example, such behaviors or activities may include detection of various types of unauthorized or suspicious access to system resources. In other examples, it may occur that multiple instances of integrity violations detected by the integrity checker 130 are correlated with a single user, which may indicate a higher likelihood of unauthorized behavior by the user.

A response handler 138 may be configured to execute a response to potential security violations determined by the integrity checker 130 and/or the correlation analyzer 136. For example, the response handler 138 may include a notification generator 140 that is configured to generate a message, display a warning, or provide a notifier to one or more recipients, which may specify aspects of the potential security violation.

In other examples, the response handler 138 may take other action. For example, depending on a degree of confidence of the correlation analyzer 136, the response handler 138 may be configured to shut down an application, or the operating system 104 itself, if considered necessary to protect against a threat. In some implementations or use case scenarios, the correlation analyzer 136 may not be used, and the response handler 138 may be configured to execute a response, including potentially shutting down the application 106 or the operating system 104, based on an output(s) of the integrity checker 130.

In more detail, the integrity checker 130 includes a table scanner 142, which is configured to scan the system services table 114 to capture the system services verification data 132 over time. For example, although the simplified example of FIG. 1 illustrates the single system service entry 124, an actual system services table may have hundreds of entries, e.g., one for each enumerated system service. Specific examples of such entries are provided below for specific types of system services.

For example, the table scanner 142 may capture a first or baseline instance of the system services table 114, including all entries thereof, at startup of the operating system 104, or at another designated time. For example, for each entry, such as the system service entry 124, the table scanner 142 may capture and store the system service address 126 and the system service type 128.

As referenced above, the system service address 126 refers to a memory or one or more of a plurality of storage locations at which the actual system service, e.g., a system service routine or code, is stored. Therefore, the system service address 126 may specify a specific memory address at which a system service routine begins, e.g., together with a number of memory addresses that define a length of the system service routine in memory, or may provide a starting and ending address for the system service routine.

The table scanner 142 may also capture and include a portion of the system service (e.g., of the system service routine) within the system services verification data 132. For example, the table scanner 142 may copy a designated quantity or portion of content of the system service, such as a designated number of bytes of data, from the specified storage address. For example, the table scanner 142 may copy the first 256 bytes of data of each system service of each entry for inclusion in the system services verification data 132.

The table scanner 142 may capture the system services verification data 132 over multiple time periods, e.g., regularly according to a pre-defined interval, in response to a triggering event (e.g., start-up), or in response to a command by an administrator of the system. Then, an address comparator 144 may be configured to compare storage addresses of each system service across multiple instances of captured table entries.

For example, the system services verification data 132 may include a first capture of the system service entry 124 for a system service at a first time, and a second, later capture of the system service entry 124 for the same system service at a second time. The address comparator 144 may thus compare the system service address 126 at the first time to the capture system service address 126 at the second time. If the first system service address 126 is different, from the second system service address 126 and a mismatch occurs between the two values of the system service address 126, then the address comparator 144 may determine that the integrity of the system services verification data 132 has been violated, and that a potential security violation has occurred.

Similarly, a content comparator 146 may be configured to compare content obtained from the system service address 126 across two or more captures of the system service entry 124. As described above, the table scanner 142 may capture the system service address 126 and then use the system service address 126 to retrieve and capture a designated portion (e.g., a beginning portion) of the system service, which may be referred to, e.g., as a portion of a system service routine, or system service routine portion, or just routine portion. If this captured system service content is different when comparing the two captured routine portions, so that a mismatch occurs between the captured routine portions of the system service, then the content comparator 146 may determine that the integrity of the system services verification data 132 has been violated, and that a potential security violation has occurred.

Also, with respect to the integrity checker 130, a type inspector 147 may verify that a system service at the system service address 126 corresponds to the system service type 128. For example, the type inspector 147 may determine a mismatch between a function or nature of each system service and its corresponding type. In other examples, the type inspector 147 may determine a mismatch between a first system service type captured at a first time and a second (changed) system service type captured at a second time.

An area authenticator 148 may verify that the system service address 126 is within a storage area (or type of storage area) corresponding to the system service type 128. For example, in a simplified example, the system service of the system service entry 124 may be expected to have a particular type out of multiple potential types, while each type is associated with a respective, corresponding storage area of storage areas. Therefore, the area authenticator 148 may be configured to confirm that the system service address location is within the corresponding, expected storage area (e.g., within corresponding storage area boundaries).

Thus, with respect to the type inspector 147 and the area authenticator 148, it is possible that the system service in question might correspond to an included type, but be stored in an unexpected storage location. It is also possible that the system service in question might correspond to an included type, but be stored in an expected storage location for that type. It is also possible that the system service in question might not correspond to an included type, and be stored in an unexpected storage location for the included type.

These and other detected mismatches may therefore lead to a notification of a potential security violation. For example, any of the address comparator 144, the content comparator 146, the type inspector 147, and the area authenticator 148 may immediately notify the response handler 138 of any such mismatch(es). The response handler 138 may take appropriate, pre-designated action, such as shutting down the operating system 104, or implementing the notification generator 140 to send an appropriate message, alert, or other notification.

As referenced above, the correlation analyzer 136 may also be configured to process the system services verification data 132, with or without separate correlation data 134, to notify the response handler 138 of a possible security violation. For example, the correlation analyzer 136 may detect correlations between outputs of the address comparator 144, the content comparator 146, the type inspector 147, and/or the area authenticator 148, either together with, or independently of, the separate correlation data 134.

For example, the correlation analyzer 136 may determine that the system service address 126 has changed, does not match an expected type of the system service type 128 and is not stored within an expected storage area corresponding to the system service type 128. When multiple such mismatches occur, the correlation analyzer 136 may be configured to be more likely to instruct the response handler 138 to issue a response to perform further analysis using the correlation data 134, or to instruct the response handler 138 to issue a stronger response (e.g., to execute a partial or complete system shutdown) than if only a single mismatch is detected.

Figure 2:
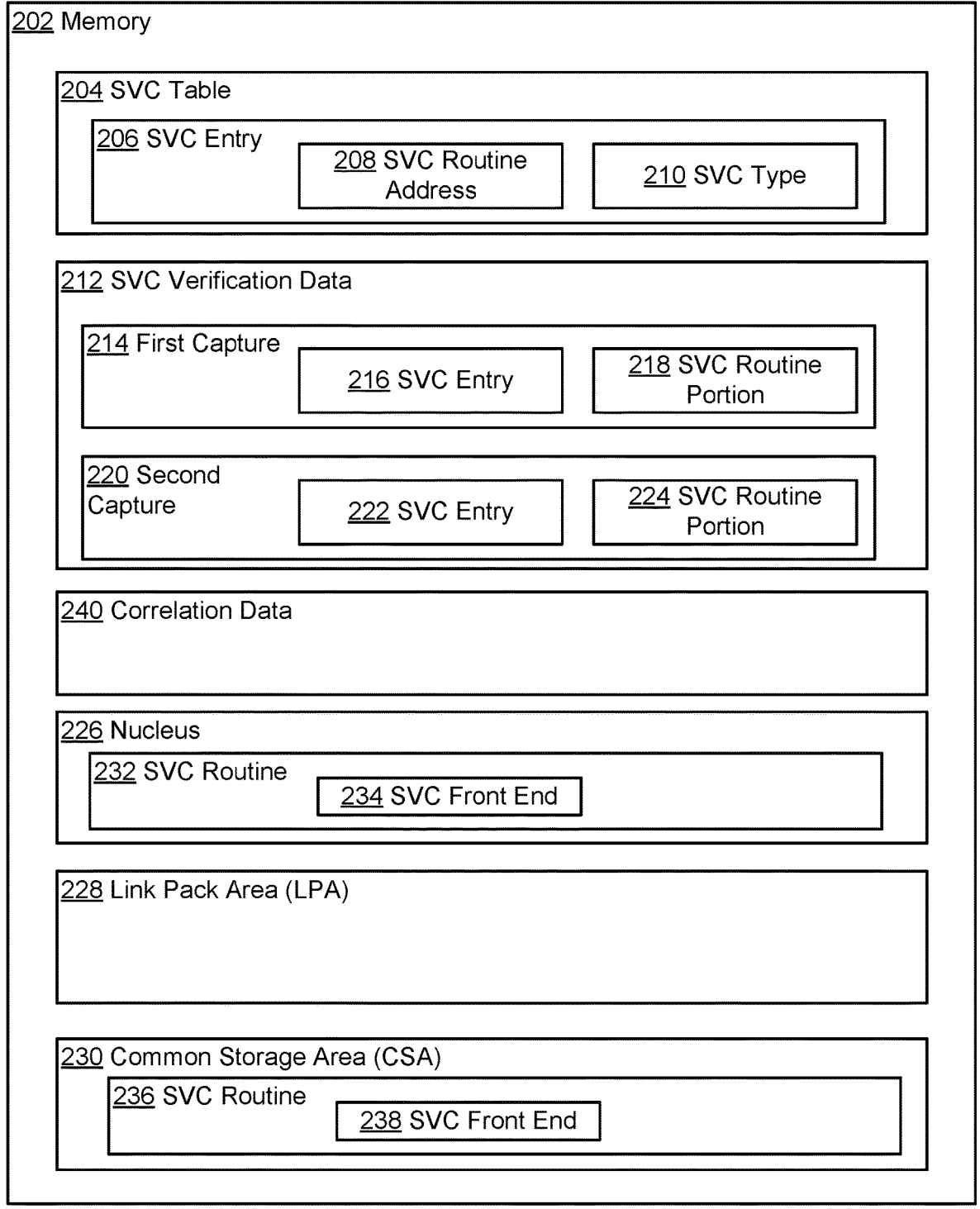
FIG. 2 is a block diagram illustrating more detailed examples of operations of the system of FIG. 1.

In FIG. 1, the security manager 102 is illustrated as being implemented using at least one computing device 150, including at least one processor 152, and a non-transitory computer-readable storage medium 154. That is, the non-transitory computer-readable storage medium 154 may store instructions that, when executed by the at least one processor 152, cause the at least one computing device 150 to provide the functionalities of the security manager 102 and related functionalities. The non-transitory computer-readable storage medium 154 may represent one or more memories (e.g., memories 202, as shown in FIG. 2), which may be used to store any and all of the system services 116, the replacement system services 118, the system services verification data 132, and the correlation data 134.

For example, the at least one computing device 150 may represent one or more servers. For example, the at least one computing device 150 may be implemented as two or more servers in communication with one another over a network. Accordingly, the security manager 102 (or individual components, modules, or portions thereof) may be implemented using separate devices in communication with one another.

In example implementations, the at least one computing device 150 may include one or more mainframe computers. In such implementations, the application 106 and the malicious application 110 represent applications that may have access to the one or more mainframe computer(s) 150, and the operating system 104 may represent a mainframe operating system. For example, the operating system 104 may represent z/OS® from IBM®, or Linux®, or any appropriate mainframe operating system.

For ease of illustration and explanation, many of the examples below are in the context of z/OS. For example, z/OS provides system services such as Supervisor Call (SVC) routines. In such examples, the system call 108 may include a SVC, and the system services table 114 may represent a SVC table.

There are 255 SVCs in the z/OS environment, any of which may do privileged work and may be called by virtually any application 106 or program running on a mainframe platform. Therefore, a corresponding SVC table has 256 entries (including a zero entry, e.g., from 0-255), with one entry for each SVC routine, whether the particular routine is currently being used or not.

In other examples, system services may include cross memory routines, where the term 'cross memory' references an ability of a program in one address space to communicate with a program in another address space. Corresponding versions of the system call 108 may be referred to as program calls.

FIG. 2 is a block diagram illustrating more detailed examples of operations of the system of FIG. 1, in the context of SVCs and corresponding SVC routines. In FIG. 2, memory 202 represents one or more memories corresponding to the computer-readable storage medium 154 of FIG. 1.

The memory 202 is illustrated as including an SVC table 204, corresponding to the system services table 114 of FIG. 1. Thus, and also in correspondence with FIG. 1, the SVC table 204 is illustrated as including a SVC entry 206, which includes a SVC routine address 208 and a SVC type 210.

FIG. 2 further includes SVC verification data 212 as an example of the system services verification data 132 of FIG. 1. Therefore, consistent with FIG. 1, the SVC verification data 212 includes a first capture 214 of a first instance of the SVC table 204, which includes SVC entry 216 representing a first instance of the SVC entry 206, as well as a SVC routine portion 218 representing a first instance of a captured portion of a corresponding SVC routine specified by the SVC routine address 208. Similarly, the SVC verification data 212 includes a second capture 220 of a second instance of the SVC table 204, which includes SVC entry 222 representing a second instance of the SVC entry 206, as well as a SVC routine portion 224 representing a second instance of a captured portion of a corresponding SVC routine specified by the SVC routine address 208.

For example, the first capture 214 may occur at a first time, such as at system start up, while the second capture 220 may occur at a second time, such as at a scheduled interval, or at a specified time, or in response to a detected event. In other examples, the first capture 214 and the second capture 220 may represent two captures of a plurality of periodically-collected captures of the SVC verification data 212.

Thus, although the simplified example of FIG. 2 illustrates only the first capture 214 and the second capture 220, implementations may capture and store any appropriate number of captures. In some implementations in which a larger number of captures are stored, the correlation analyzer 136 may search for patterns among and across the plurality of captures that may be indicative, in the aggregate, of a security violation.

Further in FIG. 2, the memory 202 is illustrated as including a plurality of memory or storage areas 226, 228, 230. Specifically, the memory 202 includes a storage area referred to as the nucleus 226, a storage area 228 referred to as the link pack area (LPA) 228, and a storage area referred to as common storage area (CSA) 230. For purposes of FIG. 2, the memory areas 226, 228, 230 should be understood to represent examples of types of memory areas included to describe functionalities of the integrity checker 130 in the context of SVC usage. Other types of memory areas may also be used, and the described memory areas may be used in different contexts than described in the following examples.

For example, the nucleus 226 may represent a type or area of memory loaded at initial program load (IPL), e.g., of the operating system 104, and/or of a mainframe computer represented by the at least one computing device 150. The LPA 228 represents an example of storage areas used for protected datasets, such as may include, or be used by, an SVC of the SVC table 204. The CSA 230 represents a memory area with relatively less or fewer data protection mechanisms (e.g., access authorization levels). More generally, the CSA 230 may include, e.g., any storage areas that are common to any running address space on the z/OS system.

More specific examples and uses of the memory areas 226, 228, 230 are provided below, e.g., with respect to FIG. 4. For purposes of FIG. 2, it should be understood that the memory areas 226, 228, 230 are parameter driven in terms of how they, and corresponding routines (e.g., SVC routines), are loaded. For example, parameters referenced above in the context of the system call 108 of FIG. 1 (e.g., PARM 1, PARM 2) may be set up by a system administrator or other authorized person to designate whether and how a routine should be loaded into one of the memory areas 226, 228, 230, or to a specific type of one of the memory areas 226, 228, 230.

Thus, relevant parameters of a SVC may designate whether a SVC routine should be loaded into a specific memory area. The SVC verification data 212 enables determination of whether a specific SVC routine is being loaded into a correct or expected one of the memory areas 226, 228, 230. The SVC verification data 212 further enables determination of whether a specific SVC routine is loaded into a different one of the memory areas 226, 228, 230 at different times (e.g., at the first capture 214 as compared to the second capture 220).

For example, an unauthorized user may use unauthorized techniques to enable loading of a malicious routine into the protected LPA 228. In other examples, an unauthorized user may use unauthorized techniques to enable loading of a routine that should be stored in the protected LPA 228, but that is instead stored in the CSA 230.

In more specific examples illustrated in FIG. 2, the nucleus 226 is illustrated as including a loaded SVC routine 232. The SVC routine 232 includes a SVC front end 234. Thus, the nucleus 226 may represent a memory area having a starting memory address and an ending memory address, defining the boundaries of the nucleus 226 storage area. The SVC routine 232 may similarly have a starting address and may have a length that defines an entirety of memory area used by the SVC routine 232. The SVC front end 234 thus represents or includes a first portion (e.g., first 256 bytes of content) of the memory occupied by the SVC routine 232.

Similar comments may apply to a SVC routine 236 of the CSA 230. For example, as shown, the SVC routine 236 includes a SVC front end 238. The LPA 228 also may include a SVC routine 228a and included SVC front end 228b.

In one example implementation, the SVC routine 232 of the nucleus 226 may be captured by the table scanner 142 in the first capture 214. The SVC entry 216 may thus identify an address and type of the SVC routine 232 at a first time, while the SVC routine portion 218 includes the SVC front end 234 as captured by the content comparator 146.

Then, the type inspector 147 may determine whether the captured type matches an expected type. Similarly, the area authenticator 148 may determine whether the SVC routine 232 is expected to be stored within the nucleus 226. If so, the area authenticator 148 may determine address boundaries of the nucleus 226 to determine whether the address of the SVC routine 232 as captured within the SVC entry 216 does actually fall within the determined address boundaries of the nucleus 226.

The SVC routine 232 of the nucleus 226 may be captured by the table scanner 142 in the second capture 220. The SVC entry 222 may thus identify an address and type of the SVC routine 232 at the second time, while the SVC routine portion 218 includes the SVC front end 234 as captured by the content comparator 146 at the second time.

As with the first capture 214, the type inspector 147 may determine whether the captured type in the SVC entry 222 of the second capture 220 matches an expected type. Similarly, the area authenticator 148 may determine whether the SVC routine 232 is expected to be, and is actually, stored within the nucleus 226.

At the second time of the second capture 220, for example, it may occur that the SVC routine 232 resides within the nucleus 226 as expected, but has a different address therein, as determined by the address comparator 144. Similarly, the content comparator 146 may determine that the SVC routine portion 224 of the second capture 220 is different from the SVC routine portion 218 of the first capture 214.

In other examples, at the time of the second capture 220, it may occur that the SVC entry 222, corresponding to (e.g., having a same SVC entry number as) the SVC entry 216 now identifies an address of the SVC routine 236 within the CSA 230. For example, a pointer of the relevant SVC may have been changed from pointing to an address within the nucleus 226 to pointing to an address within the CSA 230.

In such situations, the type inspector 147 may again determine whether the detected SVC type within the SVC entry 222 matches an expected type, and/or whether the detected SVC type within the SVC entry 222 matches the previously-captured detected SVC type of the SVC entry 216.

The address comparator 144 may then determine that the routine address of the SVC entry 222 of the second capture 220 is now different from the routine address of the SVC entry 216 of the first capture 214. The area authenticator 148 may determine that the SVC type of the second SVC entry 222 corresponds to the nucleus 226, but that the actual memory area of the SVC routine 236 is in the boundaries of the CSA 230. Or, even if the SVC type of the SVC entry 222 has been changed to correspond to residence of the SVC routine 236 within the CSA 230, the address comparator 144 and/or the area authenticator 148 may determine that a change has occurred with respect to memory storage areas as between the first capture 214 and the second capture 220.

At later times, a third and subsequent capture(s) may be obtained and stored within the SVC verification data 212. Any and all of the various analyses and comparisons described with respect to the first capture 214 and the second capture 220 may be made between any two or more of the resulting captures, including the third and subsequent captures. Accordingly, using the techniques described, any inappropriate SVC entry may be identified, any changes between pairs of captures may be identified, and any patterns of changes across three or more captures may be identified.

Moreover, correlation data 240 may be captured concurrently with the various captures of the SVC verification data. For example, various log data capturing user activities may be captured. Then, any resulting integrity violations may be analyzed by the correlation analyzer 136 of FIG. 1. For example, potential integrity violations may be assigned specific risk types and/or levels, and/or individual users or applications may be flagged as suspicious, again with corresponding risk types and/or levels being assigned.

Accordingly, the response handler 138 of FIG. 1 may perform assigned actions. For example, the response handler 138 may generate a notification of potential integrity violation(s), perhaps with supplemental risk information as determined by the correlation analyzer 136. In other examples, the response handler 138 may take immediate corrective action, such as freezing a particular operation or application, or disabling an entire system, based on the determined risk type/level.

Thus, the examples of FIGS. 1 and 2 illustrate that described techniques enable an identification or narrowing of a time window during which a potential security violation may have occurred or been initiated. As a result, and even though it may be difficult or impossible to intercept and halt a malicious system services call (e.g., SVC), described techniques enable fast and accurate response options across a range of potential security violations.

Figure 3:
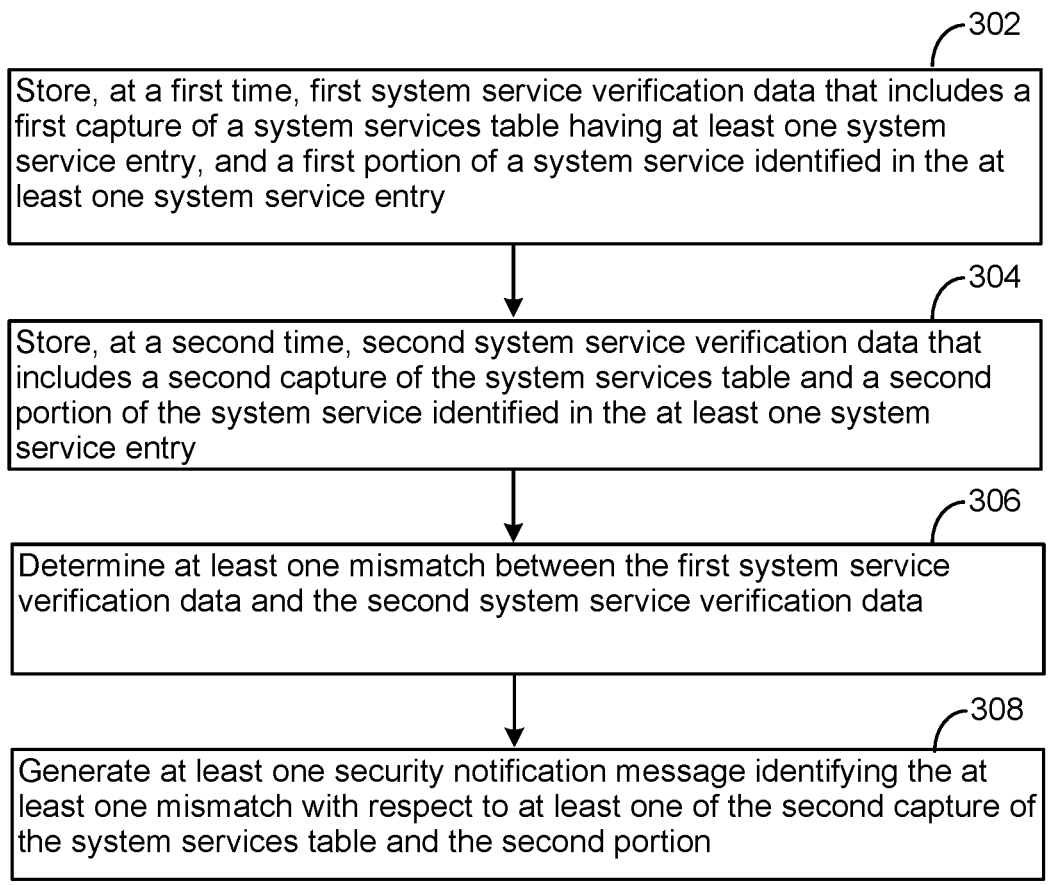
FIG. 3 is a flowchart illustrating example operations of the system of FIG. 1.

FIG. 3 is a flowchart illustrating example operations of the system of FIG. 1. In the example of FIG. 3, operations 302-308 are illustrated as separate, sequential operations. In various implementations, the operations 302-308 may include sub-operations, may be performed in a different order, may include alternative or additional operations, or may omit one or more operations. Further, in all such implementations, included operations may be performed in an iterative, looped, nested, or branched fashion (as illustrated, for example, in the flowchart of FIG. 4).

In FIG. 3, at a first time, first system service verification data may be stored that includes a first capture of a system services table having at least one system service entry, and a first portion of a system service identified in the at least one system service entry (302). For example, the table scanner 142 of FIG. 1 may perform a capture of at least a portion of the system services table 114 of FIG. 1 at a first time, including at least one table entry thereof. In a more specific example, the table scanner 142 may capture the SVC table 204, including the SVC entry 216. The resulting capture may be stored in system services verification data 132 of FIG. 1, or as the first capture 214 within the SVC verification data 212 of FIG. 2.

In FIG. 2, in conjunction with the first capture 214, the type inspector 147 may perform an inspection of the type of each SVC table entry to determine whether any included types match expected types. The area authenticator 148 may determine whether the address of each SVC routine of each SVC table entry falls within an expected memory storage area, e.g., within address boundaries of an expected memory area such as the nucleus 226, the LPA 228, or the CSA 230.

At a second time, second system service verification data may be stored that includes a second capture of the system services table and a second portion of the second system service identified in the at least one system service entry (304). For example, the table scanner 142 of FIG. 1 may perform a capture of at least a portion of the system services table 114 of FIG. 1 at a second time, including at least one table entry. In a more specific example, the table scanner 142 may capture the SVC table 204, including the SVC entry 222 of second capture 220. The resulting capture may be stored in system services verification data 132 of FIG. 1, or as the second capture 220 within the SVC verification data 212 of FIG. 2.

Both the first capture 214 and the second capture 220 may include a current system service address of the system service at the time of each capture, e.g., as determined from corresponding captured table entries. Like the first capture 214, the second capture 220 (e.g., captured table entries) may be analyzed by the type inspector 147 and the area authenticator 148 to determine current system services types and corresponding memory areas, as well as any anomalies detected therein.

At least one mismatch may be determined between the first system service verification data and the second system service verification data (306). For example, the address comparator 144 may examine the system service verification data to determine a mismatch between the first system service address of the system service in the first capture 214, as compared to the second system service address of the system service in the second capture 220, or between the first portion of the system service (e.g., front end, or first 256 bytes) in the first capture 214 and the second portion 220 (e.g., front end, or first 256 bytes) of the system service in the second capture 220. Mismatches between the types and/or memory areas of the system service in each capture may also be determined.

Although FIG. 3 is described and illustrated primarily with respect to a single table and a single system service thereof, it will be appreciated that the described operations may be performed with respect to multiple different system services tables or other identifiers. Moreover, each capture and subsequent comparison of captures may be conducted with respect to each and all system service entries (e.g., SVC entries) of captured system service table entries.

At least one security notification message may be generated identifying the at least one mismatch with respect to at least one of the second capture of the system services table and the second portion (308). For example, the response handler 138 may generate such a notification. As also described, the response handler 138 may implement various other types of configured responses with respect to the above-described analyses of the system services table(s), e.g., using the correlation data 134 and results of the correlation analyzer 136.

Figure 4:
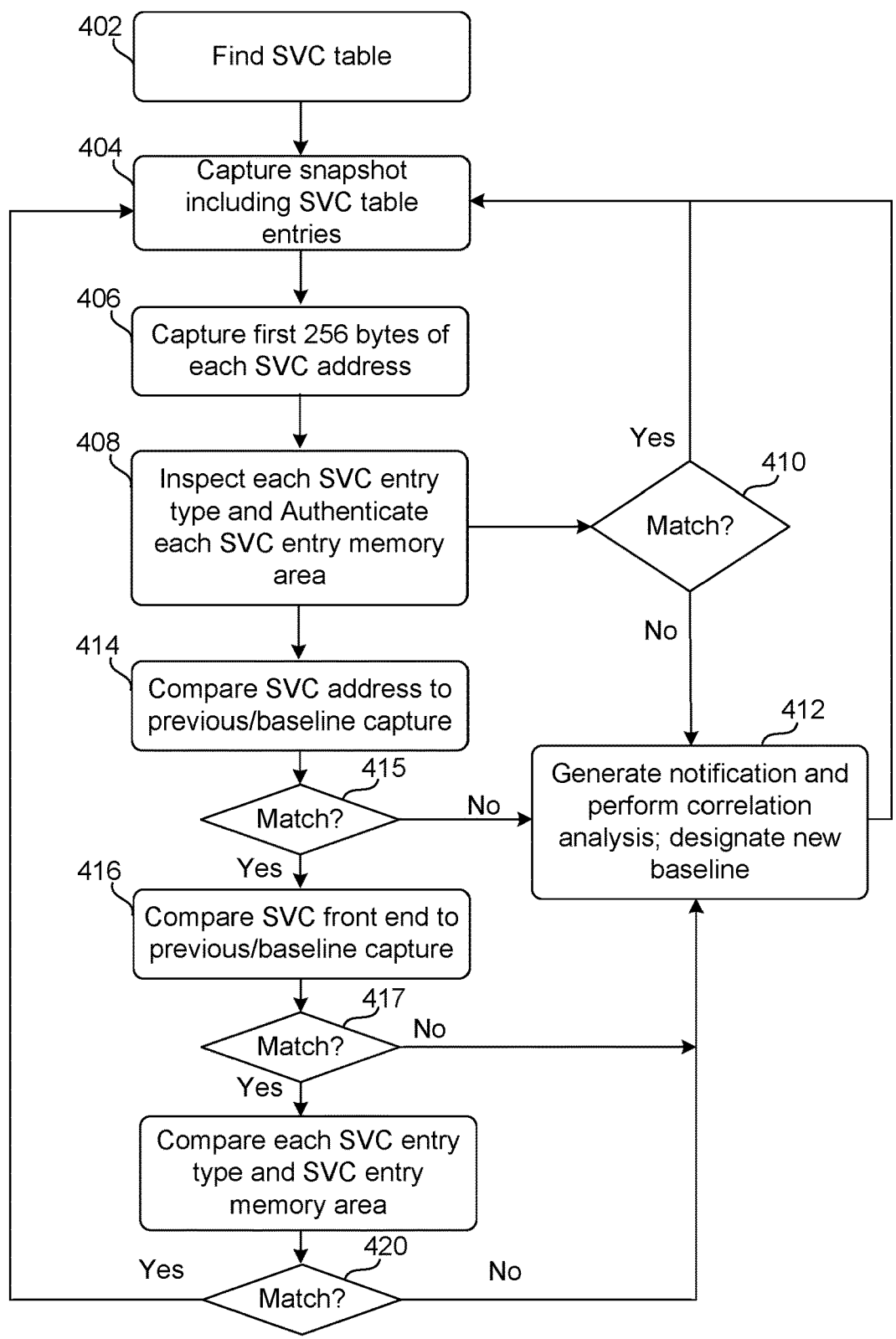
FIG. 4 is a flowchart illustrating more detailed example operations of the system of FIG. 1.

FIG. 4 is a flowchart illustrating more detailed example operations of the system of FIG. 1. FIG. 4 illustrates an example process for performing periodic, scheduled, or on-demand integrity checks and related correlation analyses to identify potential system threats in the context of SVC screening for z/OS.

In FIG. 4, an SVC table is identified and located (402). For example, at startup of the security manager 102 of FIG. 1, the SVC table 204 of FIG. 2 may be found by inspecting the communications vector table (CVT), which is a control block that enables location of other control blocks. For example, the control block field CVTABEND of the CVT may be loaded. The CVTABEND field points to the Secondary CVT (SCVT). In the SCVT, the field SCVTSVCT points to the SVC table.

As referenced above, the SVC table is typically 256 entries long, with each entry being 8 bytes in length. For example, each SVC entry includes the corresponding SVC routine address in bytes 0-3. Each SVC entry includes SVC type at byte 4. For example, the available SVC types may include type 1, type 2, type 3, type 4, type, 5, and type 6. Each SVC entry also includes the SVC attribute(s) at byte 5.

A snapshot of the SVC table entries may be captured (404). This snapshot may serve as a baseline capture, against which future captures may be compared.

Additionally, the SVC routine address at bytes 0-3 of each captured entry may be used to identify and store the first 256 bytes of each SVC address area. As described above, the first 256 bytes may be referred to as a front end of the SVC routine and are typically modified in attempts to customize SVC usage, for either permitted or illicit uses. When used for illicit purposes, the corresponding threat is referred to as a front-end attack, or front-ending.

Each SVC entry type may then be inspected. For example, an SVC of expected type 1 may be verified as such. Similarly, each SVC of each SVC type may be verified as being stored in an expected memory area (e.g., in an expected one of the Nucleus 226, LPA 228, or CSA 230 memory areas).

Specific example techniques for verifying an expected storage are provided below. In general, a match may be evaluated (410) for each expected type and/or storage area. For example, if an expected type 1 is determined to be stored as one of type 2, type, 3, type 4, type 5, or type 6, then a mismatch may be determined. Similarly, if an SVC is expected to be stored in the LPA 228 but is stored in the CSA 230, a mismatch may be determined.

In more specific examples, and as referenced above, the provided 256 SVCs include user-defined SVCs allocated for SVCs 200-255. One of these user-defined SVCs may have been created and reflected in the SVC table 204 with an unexpected type or memory area, prior to a startup of the security manager 102, and may be detected as such upon startup of the security manager 102.

If a mismatch is determined (410), then a notification may be generated, correlation analysis may be performed, and a new baseline may be designated (412). For example, the mismatch may simply result from an authorized user implementing a customized SVC for an authorized purpose. Providing a notification allows an administrator to evaluate whether the purpose is actually authorized.

Additionally, correlation analysis may be automatically performed using existing log data and other system metrics to determine and assess a relative threat level, and/or type of potential threat. For example, the SVC in question may be determined to be frequently called with respect to a security-sensitive application or may be called by a user who is determined to frequently create, call, and/or use such modified SVC.

Regardless of whether a match is determined, a subsequent snapshot of the SVC table entries may be captured at a later, second time (404), along with a capture of the first 256 bytes of each SVC routine (406) at the second time. Again, each SVC entry type may be inspected, and each SVC entry memory area may be authenticated (408). A match or mismatch may be determined for each entry type and memory area (410), and, if needed, a notification may be generated, correlation analysis may be performed, and a new baseline designated (412).

Additionally, a comparison may be made for each SVC entry between the SVC routine address of that entry in the first capture 214, as compared to the SVC routine address of that entry in the second capture 220 (414). If there is not a match (415), a notification may be generated, correlation analysis may be performed, and a new baseline designated (412).

Otherwise, each SVC front end (e.g., first 256 bytes) of the second capture 220 may be compared to the corresponding SVC front end of the first capture 214 (416). If there is not a match (417), a notification may be generated, correlation analysis may be performed, and a new baseline designated (412).

Further, a comparison may be made for each SVC entry type (and memory area) between the entry type of that entry in the first capture 214, as compared to the SVC entry type (and memory area) of that entry in the second capture 220 (414). Thus, mismatches between captured types may be referred to as type mismatches, and mismatches between captured memory areas may be referred to as memory area mismatches.

Any mismatch determined for any entry between the first and second captures (420) may result in notification generation, correlation analysis being performed, and a new baseline designated (412). Regardless of whether any mismatch is detected (420), the security monitor may proceed with capturing the third snapshot or capture of the SVC table at a third time (404).

If a mismatch is detected, then the subsequent (e.g., third) capture (402) may be designated as a new, updated baseline capture. Otherwise, the subsequent capture may be compared against the original (e.g., first) baseline capture. In this way, the process of FIG. 4 may continue iteratively throughout an execution of the security manager 102.

In more specific examples of the operation 408, specific memory areas, e.g., boundary addresses of memory areas such as the nucleus 226, LPA 228, or CSA 230 (or subsections thereof) may be determined by accessing the CVT field Virtual Storage Extension (CVTSMEXT). For example, the nucleus 226 may include a read-only nucleus area, a read/write (RW) nucleus area, an extended RW (Ext RW) nucleus area, or other areas. Similarly, the LPA 228 include a modified LPA (MLPA), fixed LPA (FLPA), or pageable LPA (PLPA).

Thus, for example, the area authenticator 148 of FIG. 1 may be configured to use the CVTSMEXT field to obtain the starting and ending address of the RW nucleus, the starting and ending address of the read-only nucleus, and the starting and ending address of the Ext RW nucleus. The area authenticator 148 of FIG. 1 may be further configured to use the CVTSMEXT field to obtain the starting and ending address of the MLPA, the FLPA, and the PLPA. The area authenticator 148 of FIG. 1 may be further configured to use the CVTSMEXT field to obtain the starting and ending address of the extended MLPA, the extended FLPA, and the extended PLPA.

As a result of the operations of FIG. 4, as described, various notification messages may be generated. For example, such a message may be used by other security monitoring systems or automation tools to alert system administrators of the anomaly.

An example notification message may include one or more of the following types of information. For example, a notification message may include the SVC Number of the SVC Alert (0-255), and a SVC Description for the SVC Alert (including, e.g., designating user SVCs (200-255) as "USER" and unused SVCs as "UNUSED"). The message may include an "OLD Address" as the address in memory of the SVC before it was modified, and a "NEW Address" as the address in memory of the SVC after it was modified. The message may include the "SVC Address" as the address in memory of the SVC for the SVC Alert, and the "SVC Type" as the type of the SVC for the SVC Alert. The message may include the "SVC Type Expected" as the expected SVC type for the SVC Alert, and the "SVC Location" as the expected SVC location ("NUCLEUS" or "LPA"). Thus, for example, such notification messages may specify, "ALERT: SVC 6 LINK/LINKX: Type 2 SVC expected. Found type ¾ SVC at 4069B8B0; type ¾ SVC expected to be in LPA. Found at 4069B8B0."

Thus, described techniques may continuously check the SVC table and storage areas in real-time. As soon as a change is detected, an appropriate notification may be generated, to thereby avoid or mitigate altered system behavior, and eliminate gateways into executing system services not normally available to a caller.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least the one computing device to:
store, at a first time, first system service verification data that includes a first capture of a system services table having at least one system service entry, and a first portion of a system service identified in the at least one system service entry, the first capture including a first address at which the system service is stored at the first time;
store, at a second time, second system service verification data that includes a second capture of the system services table and a second portion of the system service identified in the at least one system service entry, the second capture including a second address at which the system service is stored at the second time;
determine at least one mismatch between the first system service verification data and the second system service verification data, including comparing the second address to the first address and the second portion to the first portion to determine the at least one mismatch; and
generate at least one security notification message identifying the at least one mismatch with respect to at least one of the second capture of the system services table and the second portion.

2. The computer program product of claim 1, wherein the system services table includes a Supervisor Call (SVC) table.

3. The computer program product of claim 1, wherein the first portion of the system service includes a first number of bytes of content of the system service, starting from the first address, and the second portion of the system service includes a second number of bytes of content of the system service, starting from the second address.

4. The computer program product of claim 1, wherein the instructions are further configured to cause the at least one computing device to:
store, at a third time, third system service verification data that includes a third capture of the system services table and a third portion of the system service identified in the at least one system service entry, the third capture including a third address at which the system service is stored at the third time; and
determine at least a second mismatch between the second system service verification data and the third system service verification data, including comparing the third address to the second address and the third portion to the second portion to determine the at least one mismatch.

5. The computer program product of claim 1, wherein the at least one system services entry includes a type of the system service.

6. The computer program product of claim 5, wherein the instructions are further configured to cause the at least one computing device to:
compare the type of the system service to an expected type for the system service; and
generate the at least one security notification message identifying that the type does not match the expected type.

7. The computer program product of claim 5, wherein the instructions are further configured to cause the at least one computing device to:
compare a first type captured in the first capture with a second type captured in the second capture; and
generate the at least one security notification message identifying the at least one mismatch as including a type mismatch between the first type and the second type.

8. The computer program product of claim 5, wherein the instructions are further configured to cause the at least one computing device to:
compare the type of the system service to an expected memory area for the type; and
generate the at least one security notification message identifying that the type does not match the expected memory area.

9. The computer program product of claim 5, wherein the instructions are further configured to cause the at least one computing device to:
include, in the first capture, a first memory area corresponding to the type;
include, in the second capture, a second memory area corresponding to the type;
compare the first memory area to the second memory area; and
generate the at least one security notification message identifying the at least one mismatch as including a memory area mismatch between the first memory area and the second memory area.

10. The computer program product of claim 1, wherein the instructions are further configured to cause the at least one computing device to:
perform correlation analysis of the at least one mismatch using system log data captured in parallel with the first system service verification data and the second system service verification data;
identify a potential cause and corresponding threat level of the at least one mismatch, based on the correlation analysis; and
include the potential cause and corresponding threat level in the at least one security notification message.

11. A computer-implemented method, the method comprising:
storing, at a first time, first system service verification data that includes a first capture of a system services table having at least one system service entry, and a first portion of a system service identified in the at least one system service entry, the first capture including a first address at which the system service is stored at the first time;
storing, at a second time, second system service verification data that includes a second capture of the system services table and a second portion of the system service identified in the at least one system service entry, the second capture including a second address at which the system service is stored at the second time;
determining at least one mismatch between the first system service verification data and the second system service verification data, including comparing the second address to the first address and the second portion to the first portion to determine the at least one mismatch; and generating at least one security notification message identifying the at least one mismatch with respect to at least one of the second capture of the system services table and the second portion.

12. The method of claim 11, wherein the system services table includes a Supervisor Call (SVC) table.

13. The method of claim 11, wherein the first portion of the system service includes a first number of bytes of content of the system service, starting from the first address, and the second portion of the system service includes a second number of bytes of content of the system service, starting from the second address.

14. The method of claim 11, further comprising:
storing, at a third time, third system service verification data that includes a third capture of the system services table and a third portion of the system service identified in the at least one system service entry, the third capture including a third address at which the system service is stored at the third time; and determining at least a second mismatch between the second system service verification data and the third system service verification data, including comparing the third address to the second address and the third portion to the second portion to determine the at least one mismatch.

15. The method of claim 11, wherein the at least one system services entry includes a type of the system service, the method further comprising:
comparing the type of the system service to an expected type for the system service; and generating the at least one security notification message identifying that the type does not match the expected type.

16. The method of claim 15, further comprising:
comparing the type of the system service to an expected memory area for the type; and generating the at least one security notification message identifying that the type does not match the expected memory area.

17. A system comprising:
at least one memory including instructions; and
at least one processor that is operably coupled to the at least one memory and that is arranged and configured to execute instructions that, when executed, cause the at least one processor to
store, at a first time, first system service verification data that includes a first capture of a system services table having at least one system service entry, and a first portion of a system service identified in the at least one system service entry, the first capture including a first address at which the system service is stored at the first time;

store, at a second time, second system service verification data that includes a second capture of the system services table and a second portion of the system service identified in the at least one system service entry, the second capture including a second address at which the system service is stored at the second time;

determine at least one mismatch between the first system service verification data and the second system service verification data, including comparing the second address to the first address and the second portion to the first portion to determine the at least one mismatch; and generate at least one security notification message identifying the at least one mismatch with respect to at least one of the second capture of the system services table and the second portion.

18. The system of claim 17, wherein the system services table includes a Supervisor Call (SVC) table.

19. The system of claim 17, wherein first portion of the system service includes a first number of bytes of content of the system service, starting from the first address, and the second portion of the system service includes a second number of bytes of content of the system service, starting from the second address.

20. The system of claim 17, wherein the at least one system services entry includes a type of the system service, and further wherein the instructions, when executed, are further configured to cause the at least one processor to:
compare the type of the system service to an expected type for the system service; and generate the at least one security notification message identifying that the type does not match the expected type.

* * * * *